United States Patent
Fleytman

[11] Patent Number: 6,074,322
[45] Date of Patent: Jun. 13, 2000

[54] APPARATUS FOR TRANSMITTING ROTATION UTILIZING AN OSCILLATING INPUT

[76] Inventor: Yakov Fleytman, 2875 Troy Center Dr., Apt. 3028, Troy, Mich. 48084

[21] Appl. No.: 08/796,466

[22] Filed: Feb. 10, 1997

Related U.S. Application Data

[63] Continuation of application No. 08/732,150, Oct. 10, 1996.

[51] Int. Cl.[7] .............................. F16H 1/16; H02K 24/00
[52] U.S. Cl. .............................. 475/228; 475/230; 74/425
[58] Field of Search ...................... 74/425–427; 475/228, 475/229

[56] References Cited

U.S. PATENT DOCUMENTS

| | | | |
|---|---|---|---|
| 335,208 | 2/1886 | Bourcart | 74/425 X |
| 548,860 | 10/1895 | Ames | 74/425 X |
| 1,125,243 | 1/1915 | Woodbridge | 74/425 X |
| 1,600,738 | 9/1926 | Rockwell | 74/425 X |
| 1,811,058 | 6/1931 | Morgan | 74/425 X |
| 1,980,237 | 11/1934 | Trbojevich | 74/425 X |
| 2,016,177 | 10/1935 | Ream | 74/425 X |
| 2,225,957 | 12/1940 | Korff | 475/150 X |
| 2,583,140 | 1/1952 | Else | 475/150 X |
| 2,785,369 | 3/1957 | Ligh | 74/427 |
| 3,124,964 | 3/1964 | Golding | 74/88 X |
| 3,208,305 | 9/1965 | Butterbaugh et al. | 74/425 X |
| 3,220,284 | 11/1965 | Horvath | 975/230 |
| 3,895,700 | 7/1975 | Kerr | 192/41 R |
| 4,020,715 | 5/1977 | Sollars | 74/606 R |
| 4,297,919 | 11/1981 | Kuehnle | 74/427 X |
| 4,346,728 | 8/1982 | Sulzer | 74/424.8 X |
| 4,466,300 | 8/1984 | Takahashi | 74/425 X |
| 4,917,200 | 4/1990 | Lucius | 74/425 X |
| 4,973,295 | 11/1990 | Lee | 475/149 |
| 4,987,788 | 1/1991 | Bausch | 475/331 X |
| 4,987,791 | 1/1991 | Nakahashi | 74/425 |
| 5,015,898 | 5/1991 | Frey | 475/150 |
| 5,136,888 | 8/1992 | Nix | 74/88 |
| 5,333,517 | 8/1994 | Bryson et al. | 74/664 |
| 5,431,606 | 7/1995 | Bingham | 475/228 |

FOREIGN PATENT DOCUMENTS

| | | | |
|---|---|---|---|
| 1399721 | of 1988 | U.S.S.R. | G05G 19/00 |
| 1437212 | of 1988 | U.S.S.R. | B25J 9/12 |
| 1442983 | of 1988 | U.S.S.R. | G05G 19/00 |
| 1495110 | of 1989 | U.S.S.R. | B25G 9/00 |
| 1665358 | of 1991 | U.S.S.R. | G05G 10/00 |

OTHER PUBLICATIONS

"Standard Handbook of Machine Design", by Joseph Shigley and Charles Mischke, 36–8–1, McGrawHill, 1992.
Design of Industrial Double–Enveloping Wormgears (ANSI/AGMA–6030–C87).

Primary Examiner—Khoi Q. Ta

[57] ABSTRACT

A new type of apparatus for transmitting rotation utilizing an oscillating input utilizes a self-locking worm (1) and worm gear (3) combination with different types of means for rotating said worm about its axis of rotation relative to said worm gear described. An input to the worm gear (3) is transmitted without relative movement to the thread of the worm (1) to cause the thread and hence the rotor to rotate about an axis of the worm gear. The means preferably rotates the worm thread relative to the worm gear teeth under certain conditions when it is not desired to transmit rotation. A system for transmitting an oscillating input (4) to a single directional output (5) incorporates some of the worm and worm gear combinations with spider or bevel differentials.

10 Claims, 11 Drawing Sheets

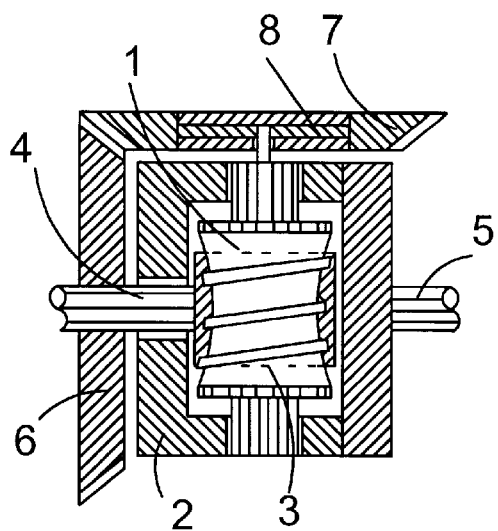
Fig. 1
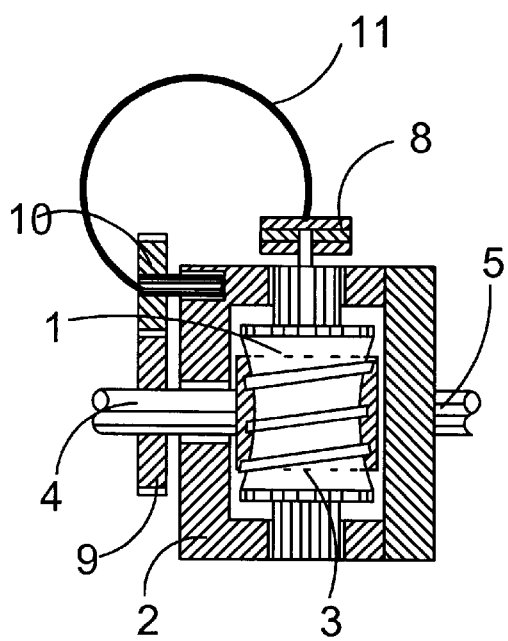
Fig. 2_1
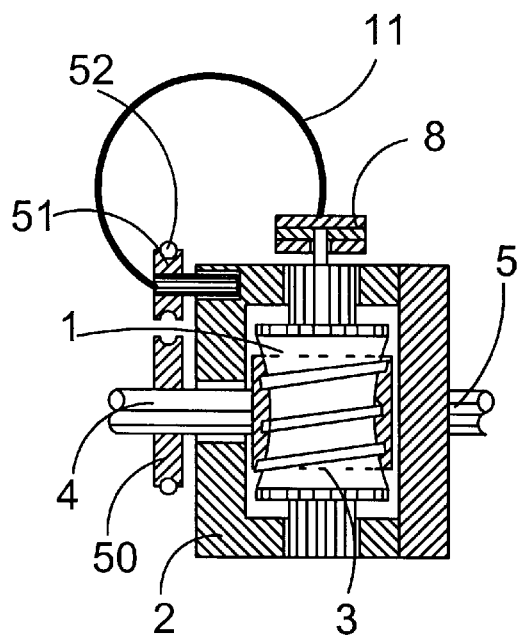
Fig. 2_2

APPARATUS FOR TRANSMITTING ROTATION UTILIZING AN OSCILLATING INPUT

This is a continuation-in-part of Ser. No. 08/732,150, filed Oct. 10, 1996.

BACKGROUND OF THE INVENTION

This invention relates to a combined transmission system that transmits an oscillating input into a single direction output.

The prior art transmissions have not successfully transmitted high torque levels. One common type of transmission device is a one-way clutch. In these known systems: such as in U.S. Pat. No. 5,333,517 by Rodney Bryson, Aug. 02, 1994, rollers or other drive members are engaged within notches or openings in a driven member. The rollers engage and move the driven member when rotation is transmitted in a first direction, but will slip when rotation is transmitted in a second direction. The invention disclosed in U.S. Pat. No. 5,333,517 has a ratio between the worm and worm gear of 5, however, the number of threads on the worm is more than one, and the worm does not have a self locking feature. These types of clutches have enjoyed wide usage, but have been unable to transmit high torque loads. One proposal suggests using a pair of such clutches with an oscillating input to perform as a part of a vehicle transmission. Due to the low torque load, this system would be impractical. A main disadvantage of these types of clutches is a discrete characteristic of changing of contact. It leads to mechanical shocks during every new contact between driving and driven elements. Drive systems for providing speed in a single rotational direction from a reversible input are also well known (U.S. Pat. No. 5,333,517 by Rodney Bryson, Aug. 02, 1994). But this system has a gear train with some backlashes and it is not able to provide a small amplitude of vibration. Besides, the input and output shafts are perpendicular to each other, and therefore, this drive system cannot be used in many applications.

In one system disclosed in a Soviet inventor certificate number 1,495,110 (1989) granted to the inventor of this invention, a self-locking transmission is utilized to transmit rotation. In the disclosed system, a worm and a worm gear combination are utilized to transmit rotation. The rotation is transmitted utilizing the engaged teeth and thread of the gears such that there is not relative movement between the two gear members during this rotation. With such a system, many valuable benefits result. In particular, one is able to accurately and efficiently transmit rotation through the self-locking transmission. A main advantage of these types of clutches is continuous contact between the driving and driven elements.

In addition, the standard power supply utilized with such systems has difficulty allowing any of the structure to freely turn about 360 degrees. Instead, electrical supply lines have typically limited the operative members to a restricted range of rotation. This is, of course, undesirable.

The term "self-locking" as is utilized in this application to describe the inventive worm and worm gear combination, requires that the teeth of the worm gear when in contact with the thread of the worm, are incapable of rotating the worm about its axis. The teeth do not slip on the thread causing the thread to rotate about its own axis. By carefully selecting the material of the respective teeth and threads, and the respective angles, a worker of ordinary skill in the art would be able to achieve this goal.

There are some deficiencies in the system disclosed in the prior inventor's certificate, however, and this invention and a parent patent application of the same inventor, Ser. No. 08/732,150, filed Oct. 16, 1996 entitled "Worm/Wormgear Transmission And Apparatus For Transmitting Rotating Utilizing An Oscillating Input" disclose improvements to the prior art system, and PCT International Application No. PCT/US96/02918.

SUMMARY OF THE INVENTION

The present invention describes the effect of "self-lock" between a worm and worm gear which is used for designing a one way clutch. Typically, in previous art, free motion of a worm has been provided by an electric motor. This is important for the purpose of reversing the direction of transferring torque, but the worm has to rotate effectively at a rate which is equal to the ratio of the gear teeth and thread of the worm gear and worm. New in this invention are a gear train or pulley drive (flexible shaft is optional) comprising an on/off clutch and input of the train (drive) being driven by said worm gear and the worm being driven from the output of the train (drive).

The worm and worm gear combination is incorporated into a system wherein the worm is mounted for rotation in a rotor. The rotor surrounds a driving worm gear. A rotational input is applied to the worm gear. The worm gear teeth engage the thread on the worm, the worm and the rotor rotate about the axis of the worm gear. This rotation is without relative movement between the engaged teeth of the worm and worm gear.

An auxiliary motor (or an on/off clutch) is preferably mounted on the rotor, and rotates the worm relative to the worm gear to either return the worm gear to its original position, or allow the worm gear to move relative to the worm when an oscillating input is utilized. When subjected to an oscillating input, the worm and rotor act as a mechanical diode, resulting in a single direction output. When we use the motor instead of the gear train comprising an on/off clutch, we need to synchronize on/off action of the clutch according to oscillation of the worm gear.

In describing different versions of transmissions, the base of the design is a grounded rotor which is holding the worm. Due to this, there is no problem connecting the electrical connections to the operative members even when the operative members freely rotate more than 360 degrees. Balancing of the rotor also becomes easy. Versions of designs with a worm gear attached to the different members of the spider differential and bevel differential are the foundations of the invention. Transmissions with different ratios are provided as combinations of these designs. Examples, shown in this patent application are not described in the parent patent application. The usage of this invention not only transmits the rotation utilizing an oscillating input but also transmits the torque for the conventional power transmission. For example, this system can be utilized as part of a vehicle transmission or a gear box with changeable ratio.

These and other features of the present invention may be best understood from the following specification and drawings, of which the following is a brief description.

BRIEF DESCRIPTION OF THE DRAWINGS

FIG. 1 is a cross-sectional view of the present invention with a gear train comprising an on/off clutch;

FIG. 2_1 is a cross-sectional view of the present invention with a gear train comprising the on/off clutch and a flexible shaft;

FIG. 2_2 is a cross-sectional view of the present invention with a pulley drive comprising the on/off clutch and the flexible shaft;

DETAILED DESCRIPTION OF PREFERRED EMBODIMENTS

Figure 3:
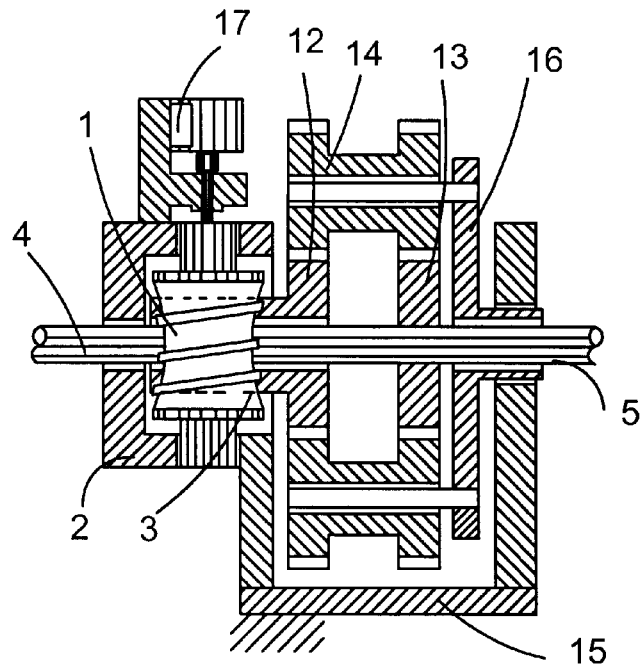
FIG. 3 is a cross-sectional view of a spider differential with a sun gear being connected to a worm gear incorporating the principles of the present invention.

An apparatus for transmitting rotation utilizing an oscillating input is shown in FIG. 1. The apparatus includes a worm 1 which is enclosed in a rotor 2. The rotor 2 forms a rigid support to mount bearings. For best results, the worm 1 is enveloping and wraps around a worm gear 3. The worm gear 3 is also enveloping and wraps around the worm 1. During the rotation of the worm 1, the worm gear 3 rotates with low speed. The minimum ratio between the number of worm gear teeth and one worm thread provided on the worm 1 is two (2). On the other hand, by rotation of the worm gear 3 worm 1 rotates with higher speed. This invention comprises means for rotating the worm 1 about its axis of rotation relative to the worm gear 3. Said means can be the auxiliary motor (described in parent patent application Ser. No. 08/732,150) or in a gear train comprising a hypoid-gear set, spiroid-gear set, bevel-gear set or helicon-gear set, may consist of gears 6, 7 with the on/off clutch 8. Input of the train is driven by the worm gear 3 from the input shaft 4 and the worm 1 is driven by the output (on/off clutch) of the train. The rotor 2 is connected to the output shaft 5. On/off clutch 8 can be a friction electromechanical clutch with natural conditions like "on" or "off". The ratio of the train is more or equal to the ratio between the number of teeth on the worm gear 3 relative to the threads on worm 1. The worm 1 and worm gear 3 have the property of self-lock.

Examples of drive means for rotating the worm 1 about its axis of rotation relative to the worm gear 3 is shown in FIG. 2_1 and FIG. 2_2. The means as disclosed in FIG. 2_1 is a gear train comprising spur gears 9, 10, flexible shaft 11 and the on/off clutch 8. The drive means as disclosed in FIG. 2_2 is a pulley drive comprising pulleys 50, 51 with belt 52, the flexible shaft 11 and the on/off clutch 8. The drive means with flexible shaft 11 is easy to assemble in a single reduction unit. To provide a preload in a direction around an axis of the worm 1 and to eliminate a backlash between the teeth of the worm gear 3 and the thread of the worm 1, it is better to use an auxiliary motor.

When the rotor 2 is grounded, the worm gear 3 is connected to one of the members of the differential gear set. As illustrated in FIG. 3, the differential gear set is a spider differential comprising sun gears 12, 13 with a spider gear 14, a housing 15 and a carrier 16 wherein the sun gear 12 is connected to the worm gear 3. For simplicity of illustration, the drive means is the auxiliary motor 17.

Figure 4:
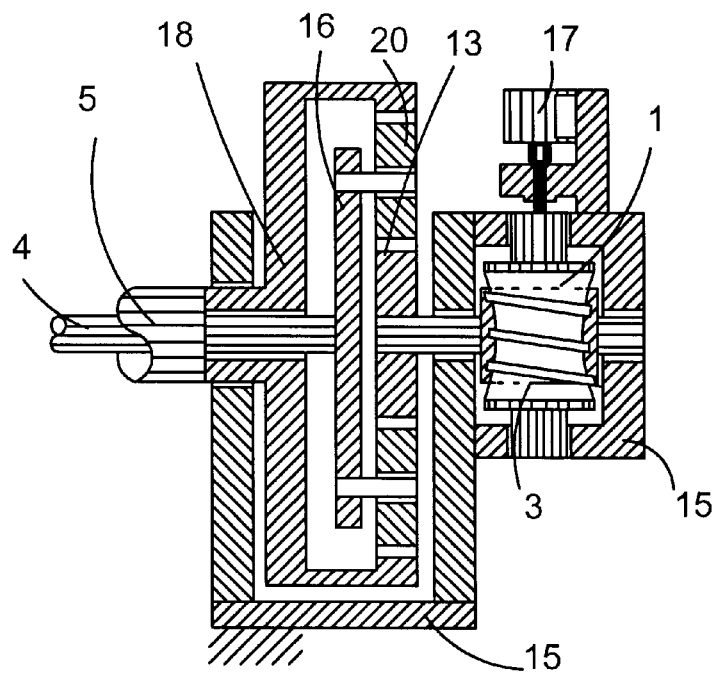
FIG. 4 is a cross-sectional view of the spider differential comprising a ring gear with the sun being connected to the worm gear.

As illustrated in FIG. 4, the differential gear set is a spider differential comprising a sun gear 13, a ring gear 18 with a spider gear 20, a housing 15, and a carrier 16 wherein the sun gear 13 is connected to the worm gear 3.

Figure 5:
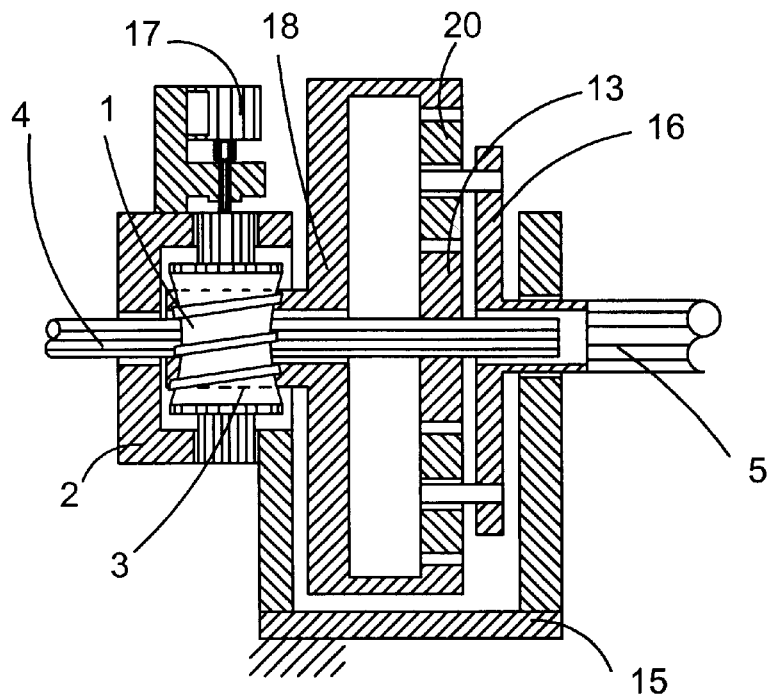
FIG. 5 is a cross-sectional view of the spider differential with the ring gear being connected to the worm gear.

As illustrated in FIG. 5, the differential gear set is a spider differential comprising a sun gear 13, a ring gear 18 with a spider gear 20, a housing 15, and a carrier 16 wherein the ring gear 18 is connected to the worm gear 3.

Figure 6:
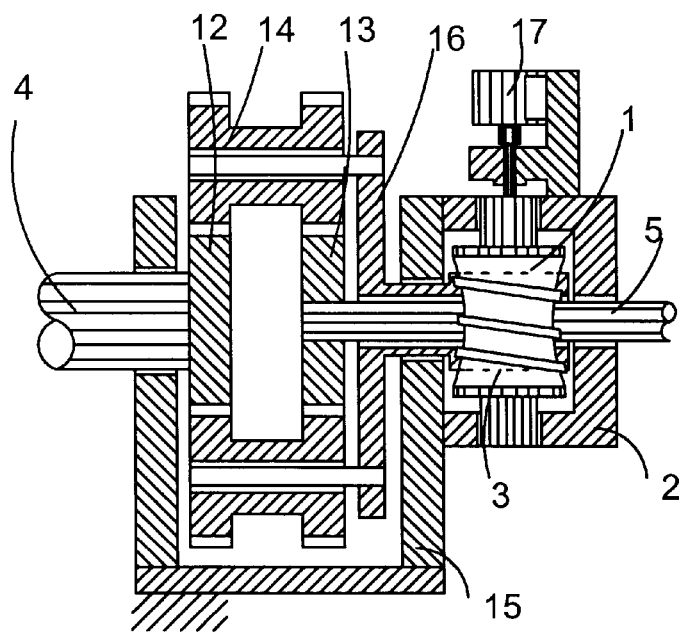
FIG. 6 is a cross-sectional view of the spider differential with the carrier being connected to the worm gear.

As illustrated in FIG. 6, the differential gear set is a spider differential comprising sun gears 12, 13 with a double spider gear 14, a housing 15, and a carrier 16 wherein the carrier 16 is connected to the worm gear 3.

Figure 7:
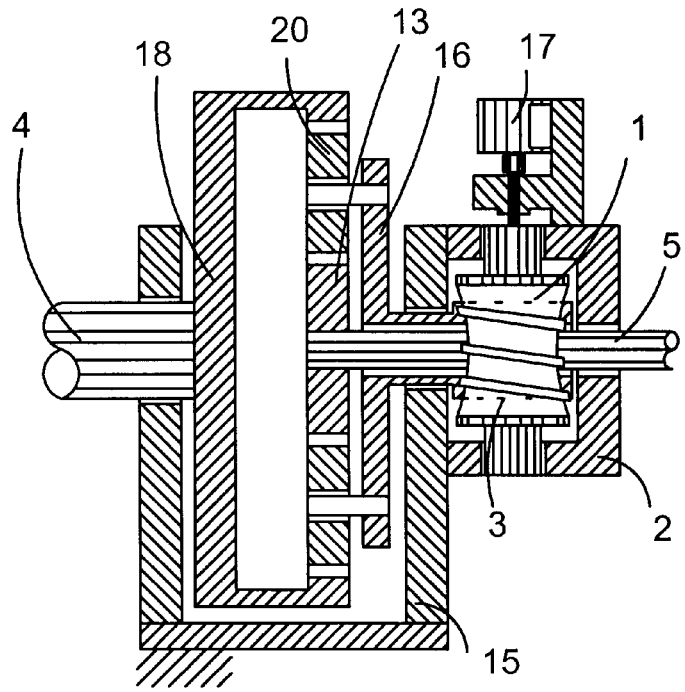
FIG. 7 is a cross-sectional view of the spider differential comprising the ring gear with the carrier being connected to the worm gear.

In an example illustrated in FIG. 7, the differential gear set is a spider differential comprising a sun gear 13, a ring gear 18 with a spider gear 20, a housing 15, and a carrier 16 wherein the carrier 16 is connected to the worm gear 3.

Figure 8:
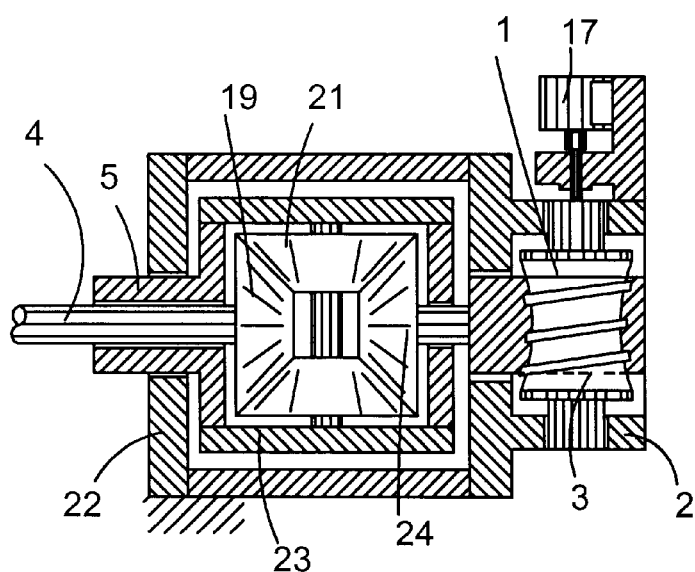
FIG. 8 is a cross-sectional view of a bevel differential with a bevel gear being connected to the worm gear.

As illustrated in FIG. 8, the differential gear set is a bevel differential comprising bevel gears 19, 24 with an idler bevel gear 21, a housing 22 and a carrier 23 wherein the bevel gear 24 is connected to the worm gear 3.

Figure 9:
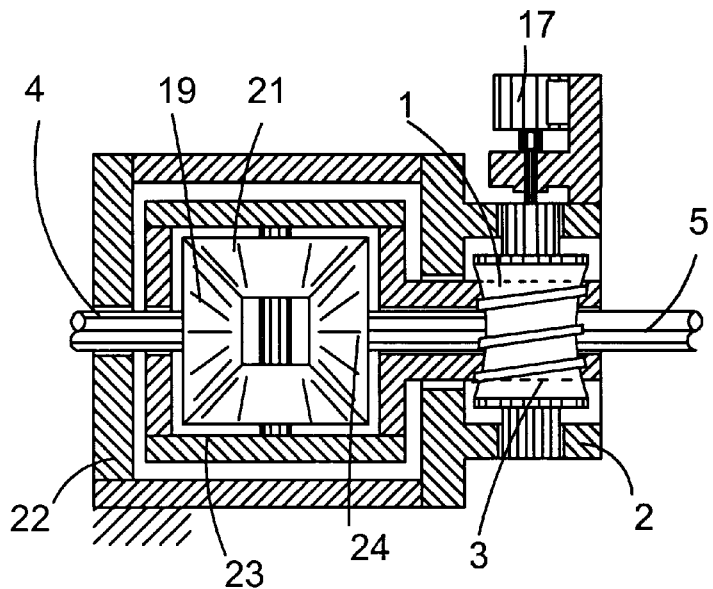
FIG. 9 is a cross-sectional view of the bevel differential with a carrier being connected to the worm gear.

As illustrated in FIG. 9, the differential gear set is a bevel differential comprising bevel gears 19, 24 with an idler bevel gear 21, a housing 22 and a carrier 23 wherein the carrier 23 is connected to the worm gear 3.

To change the ratio of the transmission or to reverse the direction of rotation, a pair of worms 1 and 25 with the rotors 2 and 2', with each of the worm gears 3, 26 can be driven by independent shafts 4 and 5 and have a differential for connecting the worm gears with members of the differential.

Figure 10:
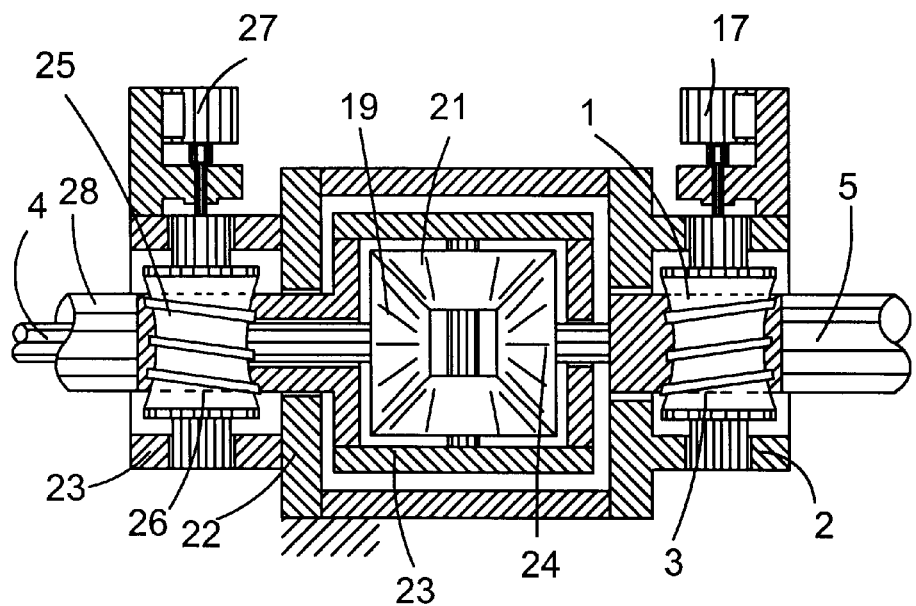
FIG. 10 is a cross-sectional view of the bevel differential with the carrier being connected to the second worm gear and the bevel gear being connected to the first worm gear.

As illustrated in FIG. 10, the differential gear set is a bevel differential comprising bevel gears 19, 24 with a spider bevel gear 21, a housing 22 and a carrier 23 wherein the carrier 23 is connected to the worm gear 26. Bevel gear 24 is connected to the worm gear 3. An extra shaft 28 can provide an opposite direction of rotation. For simplicity, the drive means are auxiliary motors 17 and 27.

Figure 11:
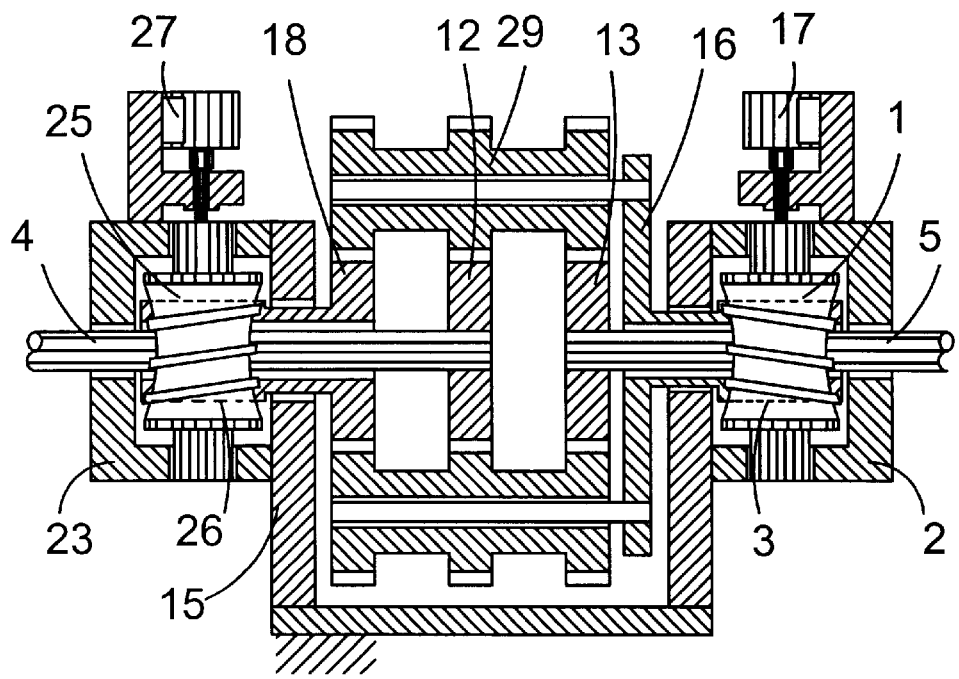
FIG. 11 is a cross-sectional view of the spider differential with the carrier being connected the first worm gear and the sun gear being connected to the second worm gear.

As illustrated in FIG. 11, the differential gear set is a spider differential comprising sun gears 12, 13, 18 with a spider gear 29, a housing 15 and a carrier 16 wherein the sun gear 18 is connected to the second worm gear 26, and the carrier 16 is connected to the first worm gear 3. For simplicity, the drive means are auxiliary motors 17 and 27.

Figure 12:
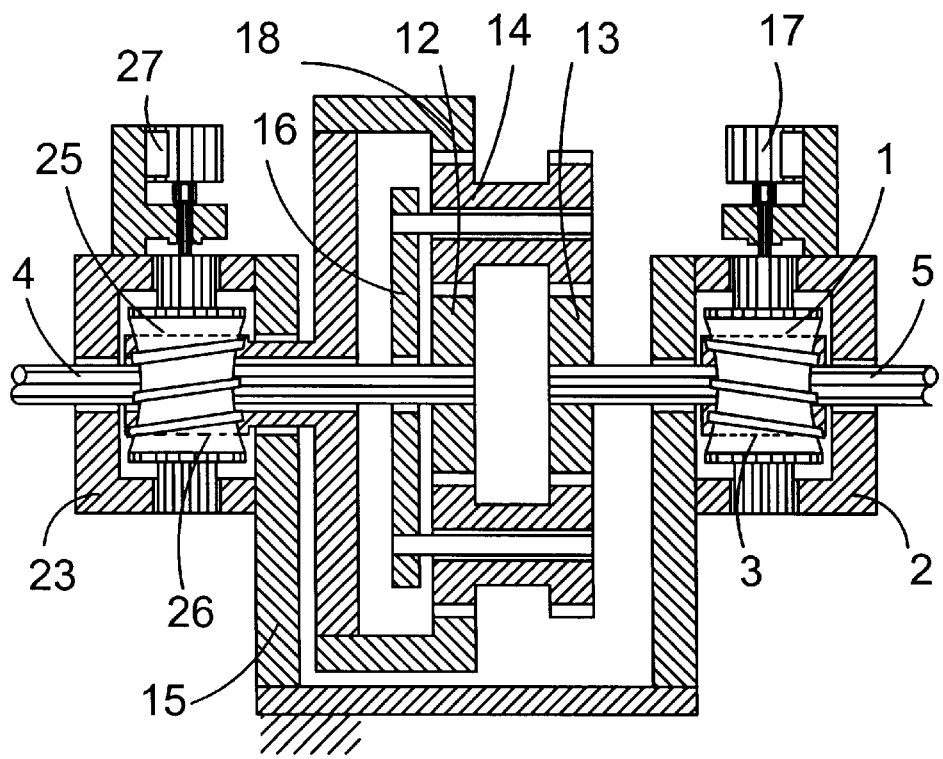
FIG. 12 is a cross-sectional view of the spider differential with the sun gear being connected to e first worm gear and the ring gear being connected to the second worm gear.

As illustrated in FIG. 12, the differential gear set is a spider differential comprising sun gears 12, 13 and a ring gear 18, a housing 15, a spider gear 14 and a carrier 16 wherein the sun gear 13 is connected to the first worm gear 3 and the ring gear 18 is connected to the second worm gear 26. For simplicity the drive means are auxiliary motors 17 and 27.

Figure 13:
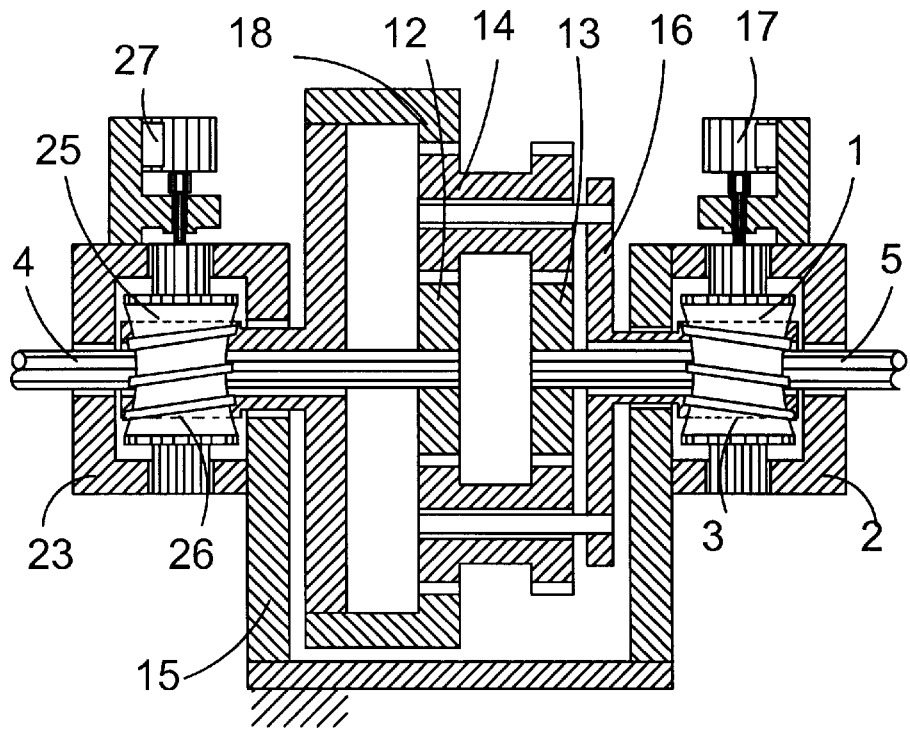
FIG. 13 is a cross-sectional view of the spider differential with the carrier being connected to the first worm gear and the ring gear being connected to the first worm gear.

As illustrated in FIG. 13, the differential gear set is a spider differential comprising sun gears 12, 13 and a ring gear 18, a housing 15, a spider gear 14 and a carrier 16 wherein the carrier 16 is connected to the first worm gear 3 and the ring gear 18 is connected to the second worm gear 26. For simplicity the drive means are auxiliary motors 17 and 27.

Figure 14:
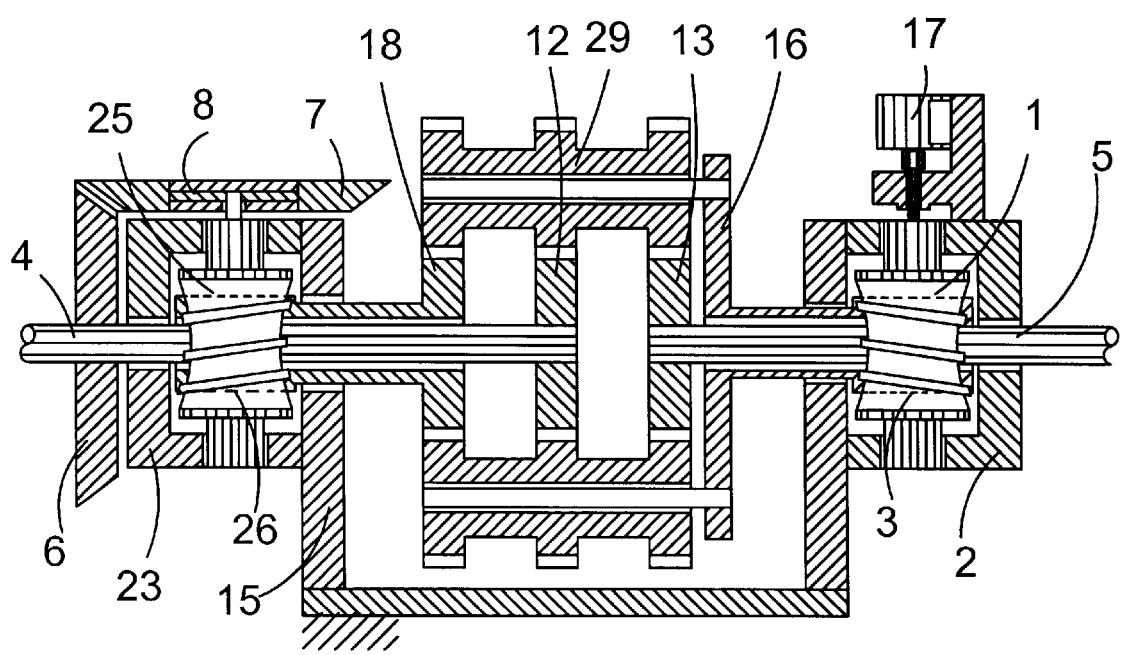
FIG. 14 is a cross-sectional view of the spider differential with the carrier being connected to the first worm gear and the sun gear being connected to the second worm gear with gear train comprising an on/off clutch.

As illustrated in FIG. 14, the differential gear set is a spider differential comprising sun gears 12, 13, 18 with a spider gear 29, a housing 15 and a carrier 16 wherein the sun gear 18 is connected to the second worm gear 26 and the carrier 16 is connected to the first worm gear 3. The first drive means are gears 6 and 7 with on/off clutch 8 and the second drive means is auxiliary motor 17.

Figure 15:
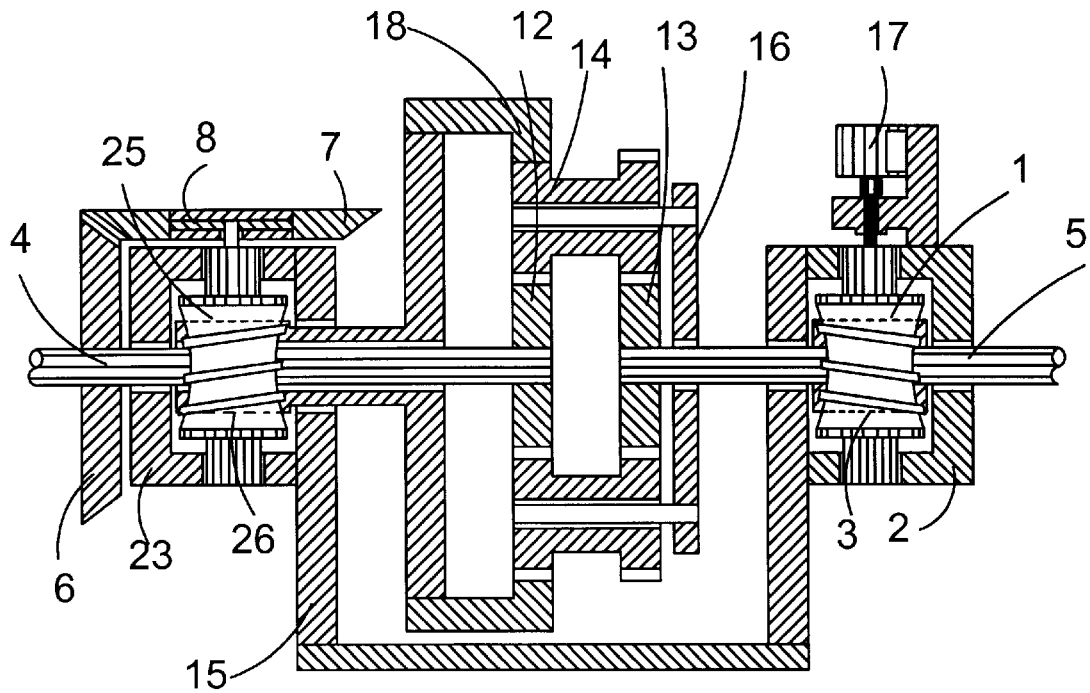
FIG. 15 is a cross-sectional view of a spider differential with the carrier being connected to the first worm gear and the sun gear being connected to the second worm gear with means, comprising the gear train with the on/off clutch and the auxiliary motor.

As illustrated in FIG. 15 the differential gear set is a spider differential comprising sun gears 12, 13 and a ring gear 18, a housing 15, a spider gear 14 and a carrier 16 wherein the carrier 16 is connected to the first worm gear 3 and the ring gear 18 is connected to the second worm gear 26. The first drive means are gears 6 and 7 with on/off clutch 8 and the second drive means is auxiliary motor 17.

Figure 16:
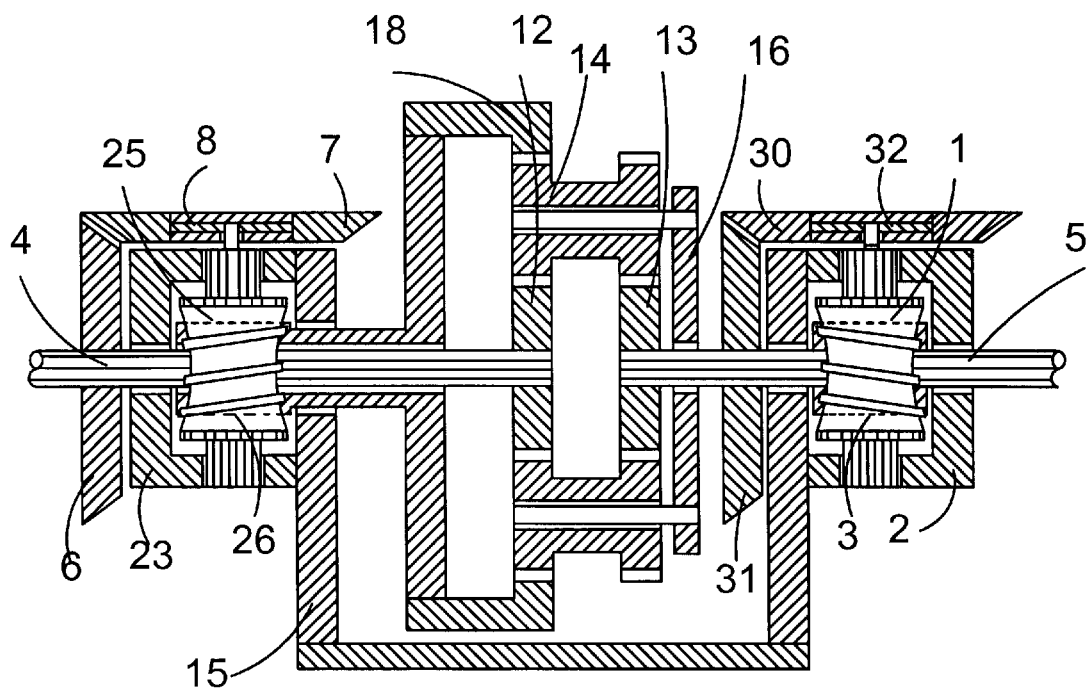
FIG. 16 is a cross-sectional view of the bevel differential with the sun gear being connected to the first worm gear and the ring gear being connected to the second worm gear.

As illustrated in FIG. 16, the differential gear set is a spider differential comprising sun gears 12, 13 and a ring gear 18, a housing 15, a spider gear 14 and a carrier 16 wherein the sun gear 13 is connected to the first worm gear 3 and the ring gear 18 is connected to the second worm gear 26. The first drive means are gears 6 and 7 with an on/off clutch 8 and the second drive means are gears 30, 31 with an on/off clutch 32.

Figure 17:
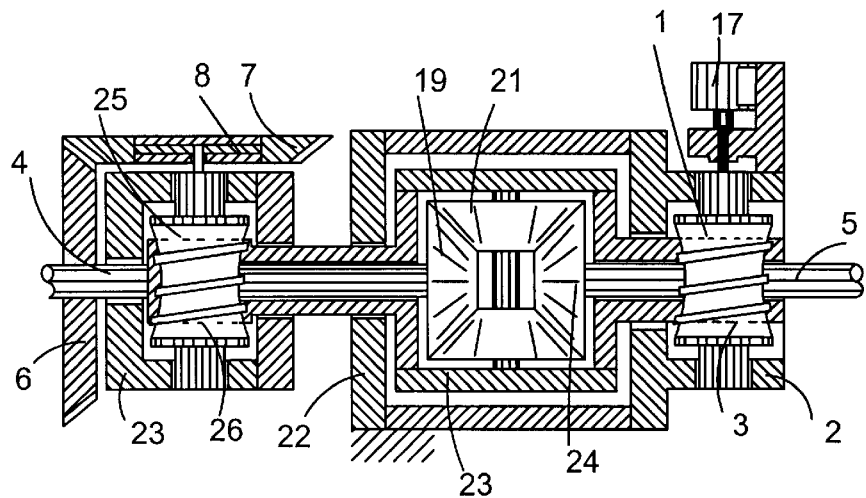
FIG. 17 is a cross-sectional view of the bevel differential being connected to the firm worm gear and the second worm gear with one fixed rotor.

FIG. 17 is a combination of FIG. 1 and FIG. 9. As illustrated in FIG. 17, the differential gear set is a bevel differential comprising bevel gears 19 and 24 with an idler bevel gear 21, a housing 22 and a carrier 23 wherein the carrier 23 is connected to the worm gear 3 and to the worm gear 26. The rotor 2 is grounded.

Figure 18:
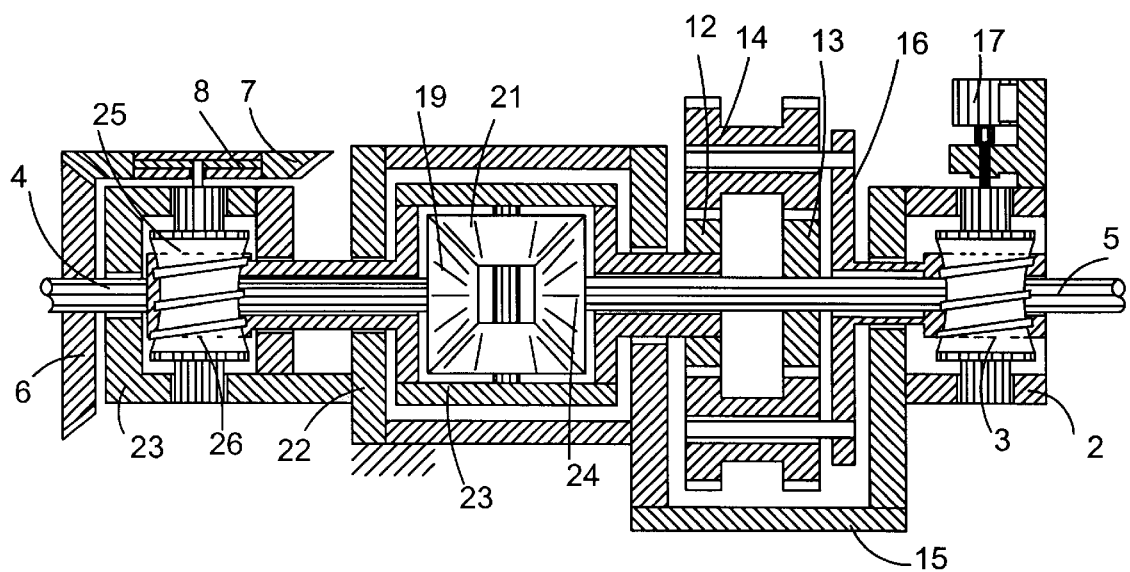
FIG. 18 is a cross-sectional view of the spider differential and bevel differential being connected to the first worm gear and the second worm gear with two fixed rotors.

As illustrated in FIG. 18, the differential gear set is a spider differential comprising sun gears 12, 13, a housing 15 with a carrier 16 and a bevel differential comprising bevel gears 19, 24 and an idler bevel gear 21, wherein the carrier 16 is connected to the first worm gear 3 and the sun gear 12 is connected to the second worm gear 26 and the carrier 23.

The first drive means are gears 6 and 7 with an on/off clutch 8 and the second drive means are gears 30, 31 with an on/off clutch 32.

Figure 19:
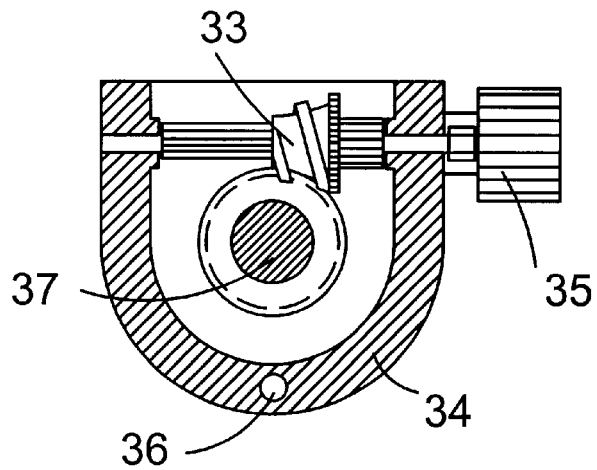
FIG. 19 is a cross-sectional view of the worm gear with the teeth engaging the thread on the half of a worm.

FIG. 19 discloses a half worm 33 enclosed in the rotor 34 and an auxiliary motor 35. For balancing, the body of the rotor 34 holds removable balancing elements 36. Half of a worm 33 is easy to assemble with the worm gear 37.

FIG. 19 is a cross-sectional view of congruent surfaces of the lands on the half of the worm 33 and the teeth of the worm gear 37. Design of these surfaces are described in U.S. Pat. No. 3,895,700 issued to John Hugh Kerr in 1975.

Figure 21:
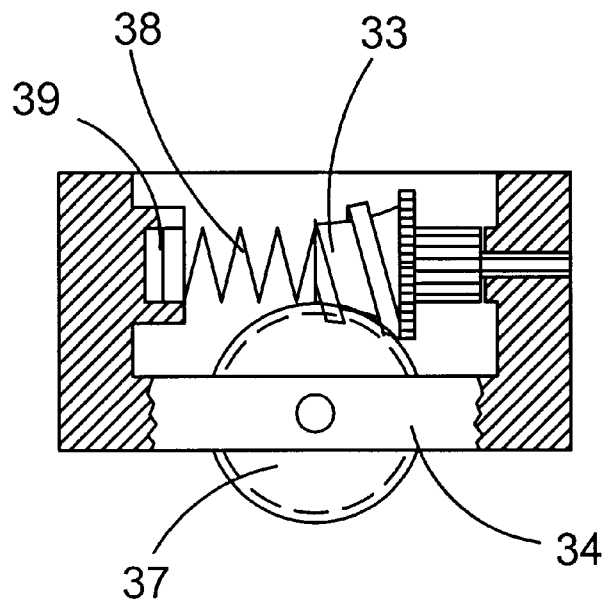
FIG. 21 is a cross-sectional view of the half of worm and worm gear with a train of a torsion spring with a friction clutch.

FIG. 21 is a cross-sectional view of the half worm 33 and worm gear 37 with a train of a torsion spring 38 and with a friction clutch 39.

Figure 22:
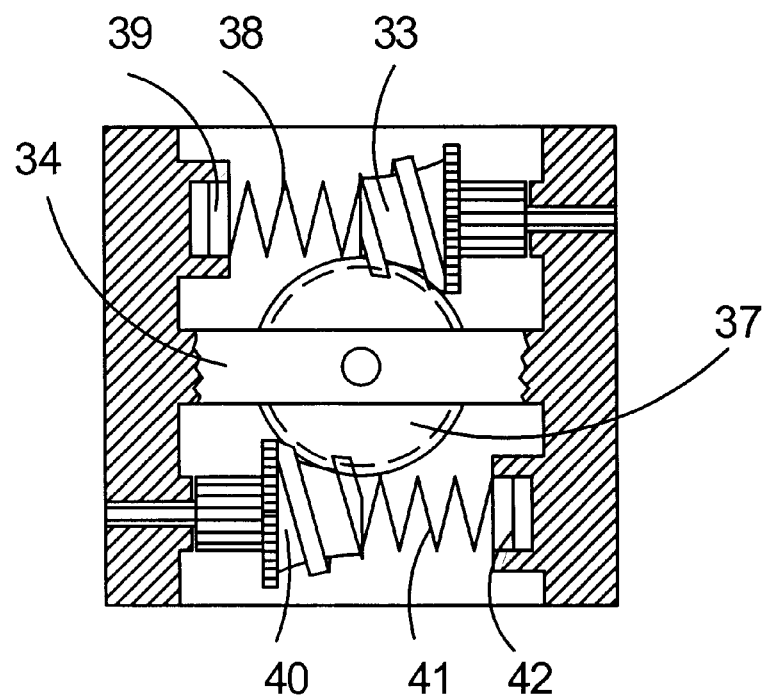
FIG. 22 is a cross-sectional view of two half of worms and worm gear with two trains of the torsion spring with the friction clutch.

FIG. 22 is a cross-sectional view of two halves of worms 33 and 40 and the worm gear 37 with two trains including the torsion spring 38 with the friction clutch 39 and the torsion spring 41 with friction clutch 42.

As shown in FIG. 1, the input shaft 4 drives worm gear 3. Output shaft 5 rotates with the rotor 2. Electrical power is supplied to the on/off clutch 8 or alternatively to an auxiliary motor. A brush commutation connection could be utilized for the inventive purposes described in this application. A control system (not shown) interrupts power between the source of electricity and the auxiliary motor or the on/off clutch. For the on/off clutch application with normal condition "on", the appearance of power changes the condition to "off".

For positive rotation fo the input shaft 4, the clutch 8 has an "off" condition. Rotation of the shaft 4 in a positive direction with worm gear 3 rotating about its axis causes the worm 1 to rotate about the axis of worm gear 3 with rotor 2. This rotation is without relative movement between the worm 1 and worm gear 3. That is, the teeth of the worm gear 3 directly engage the thread on the worm 1, and there is no relative movement during this transmission. This rotation is provided by a normal force from the worm gear teeth against the thread on the worm. There is no relative movement, and thus the efficiency is maximum. This way, rotation of the output shaft 5 is achieved. This rotation is achieved if the teeth and threads are designed to be "self-locking" as described above. A worker of ordinary skill in the art would recognize how to design a self-locking gear set. For negative rotation of input shaft 4, clutch 8 has an "on" condition. Rotation of the shaft 4 also rotates gears 6, 7 and the worm 1. This rotation is provided such that the thread on the worm 1 a voids any forces from the teeth on worm gear 3, thus avoiding any transmission of rotation to the worm 1, and rotor 2. Even when the ratio of the gear train is more than the ratio of worm gear/worm, the clutch 8 permits sliding to prevent the gear train from crushing. Rotation from the input shaft 4 is not transferred to the output shaft 5.

As explained in more detail in the parent U.S. applications, it is also desirable to have some gap between the teeth on the worm gear 3 and the worm 1. The gap is taken up prior to any transmission of rotation, and it is desirable that the contact be initially taken up as a low torque load. These features are explained in more detail in the above parent application.

As an example, worm 1 as shown in FIG. 2, rotates by transmission of rotation through flexible shaft 11. This design takes less space. The ratio between the worm 1 and worm gear 3 would require an auxiliary motor or gear train, turning the worm 1 to avoid interaction with the teeth on worm gear 3 that would be impractical when the input speed is very high. Most preferably, the ratio between worm and worm gear is less than 12. It is possible that only 2 teeth need to be utilized on the worm gear 3. As explained above, the transmission of power from the worm gear 3 to the worm 1 occurs without relative movement and is typically the case with the worm and worm gear combination. Rather, the teeth of the worm gear 3 are brought into contact with the thread on the worm 1, and the worm gear 3 is prevented from rotation about its own axis. A force is applied to the worm gear 3 which drives the worm 1 about the axis of the worm gear 3, thus imparting rotation to the rotor 2.

Since the worm and worm gears are not utilized as in standard gears to have interengaging teeth and threads, the material selected for the members is different than that which has been utilized in the past. In the past, the worm and worm gears have been formed of materials having low coefficients of friction and a lubricant is typically utilized. In this invention, lubricant would not be needed. Moreover, the worm and worm wheel are made from a strong material such as steel. The shape of the teeth and threads and the worm and worm gears are designed to achieve a self-lock feature. Even though a worker of ordinary skill in the art would recognize these designs, he would come within the scope of this invention.

In addition, a material that actually increases the friction may be placed on the teeth and threads. Again, it is a goal to achieve the self-locking property, rather than any smooth movement between the worm and the worm gear. The reduction of the number of teeth on the worm gear also reduces the inertia of the worm gear, thus increasing the speed at which the worm gear can shift between its oscillating inputs. Finally, rather than simply reducing the number of worm gear teeth, the thickness of the worm thread could be reduced to result in an acceptable gap.

The gear train or pulley drive with on/off clutch or auxiliary motor will be of a relatively low torque. Its function is to turn the worm without any interaction relative to the teeth of the worm gear and to stop under overload even when the worm is fixed by the worm gear. Thus, a high torque motor or on/off clutch needs not be utilized. For that reason, only a low amount of electrical energy is required to operate the on/off clutch or auxiliary motor.

The supply of electric energy to rotate the on/off clutch or the auxiliary motor leads to additional inconvenience. Besides, for many applications there is a need to change transferring torque or speed of rotation and change direction of the output shaft. For this purpose we use a differential which has 2 degrees of freedom. By taking off (freezing) one degree of freedom, it transforms the differential into a planetary transmission. Different examples of such designs are shown in FIG. 3–FIG. 9.

FIG. 3 and FIG. 6 describe transmissions for transferring positive/negative rotation of the input shaft 4 with different torque or disconnecting the output shaft 5 from the input shaft 4. The ratio depends on the number of teeth in gears 12 and 13.

FIGS. 4, 5 and 7 describe transmissions for changing the direction of rotation from the input shaft 4 with a different torque or disconnecting the output shaft 5 from the input shaft 4. The ratio depends on the number of teeth in gears 18 and 13.

FIGS. 8 and 9 describe transmissions for changing the direction of rotation with the same torque or disconnecting the output shaft 5 from the input shaft 4.

When adding the pair of worms 1 and 25, rotors 2 and 23 with the means (auxiliary motor 17 and auxiliary motor 27 or gear train with gear 6, gear 7, on/off clutch 8 and gear train with gear 30, gear 31, on/off clutch 32) and the worm gear 3 and the worm gear 26 with each of the worm gears being driven by an independent input shaft to a differential for connecting the worm gears with the members of the differential, we are able to change the ratio from the first number to the second number or to change the direction of rotation.

FIG. 10 discloses a transmission for changing the direction of rotation from the shaft 4 to shafts 5 or 29 or disconnecting the output shaft 5 from the input shaft 4. When the worm gear 3 is held by the worm 1, then the shaft 28 has the direction of rotation of the input shaft 4. When worm gear 26 is held by worm 25, the shaft 5 has an opposite direction of rotation from the input shaft 4.

FIGS. 11–16 disclose the designs of a transmission with a ratio of 1 (one) for connecting the input shaft 4 with the output shaft 5, when the worm gear 26 is held by the worm 25. Also, these designs are used for changing the ratio between the input 4 and the output 5 when the worm gear 3 is held by the worm 1 or disconnecting the input shaft 4 from the output shaft 5 when the worm gear 3 and the worm gear 26 are free. FIGS. 11–13 are different from FIGS. 14–16 in the drive means used for rotating the worms 1 and 25.

By combination of the transmission devices described in FIGS. 1–16 we can make many different designs of transmissions. Examples of such kinds of designs are FIG. 17 and FIG. 18. FIG. 17 is a combination of the device of FIG. 1 with the device of FIG. 9. Only rotor 3 is grounded. In FIG. 18 the rotors 3 and 23 are grounded. But this combination has other properties. When the worm 25 holds the worm gear 26, the ratio between the input 4 and the output shaft 5 is 1 (one). When the worm 1 holds the worm gear 3, the ratio between the input 4 and the output shaft 5 is –1 (minus one).

Figure 20:
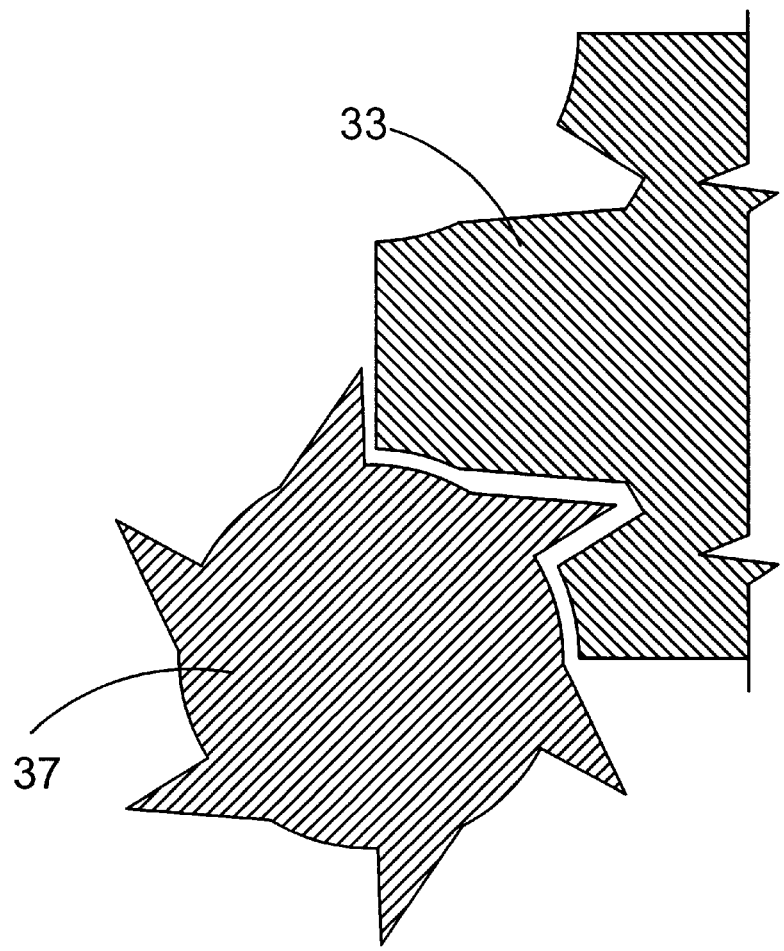
FIG. 20 is a cross-sectional view of congruent surfaces of the lands on the half of the worm and the teeth of the worm gear.

When the enveloping worm has an angle of envelop of more than 45°, assembling the worm with a gear becomes complicated. Using only half of a split enveloping worm along the axis of its rotation makes assembling more simple (FIG. 19). When congruent surfaces of the lands on the half worm and the teeth of the worm gear are sloped (FIG. 20) so that there is normal free-wheeling of the worm upon rotation of the worm gear in one direction but there is locking action upon rotation of the worm gear in the other direction, it is not necessary to use complicated means with the gear train or auxiliary motor. In this case (FIG. 21) half of a split worm 33 can be provided with means which include a train of a torsion spring 38 with a friction clutch 39 where the worm 33 is attached to the torsion spring 38 and the friction clutch 39 is attached to a rotor 34. Torsion spring 38 helps to remove clearance between the thread of the worm 33 and the tooth of a worm gear 37 after each change in direction of rotation of the input shaft 4. FIG. 22 shows that each of the worms 33 and 40 and the worm gear 37 combinations described above can transmit very high torque loads.

All of the above described designs show that a transmission may be utilized to transmit the oscillating input on the shaft 4 into a single directional rotation on the output shaft 5 but also have more functions to compare with the prior art.

The new invention described above has some advantages: it provides the fast reverse of a movement of the output shaft by changing the direction of rotation by an auxiliary motor; it requires little or no lubrication between the working parts because a worm and a worm gear have relative motion only when the worm is unloaded and eliminated of backlash between the worm gear and the worm.

Several embodiments of the present invention have been disclosed. A worker of ordinary skill in the art would recognize that certain modifications would come within the scope of this invention. For that reason, the following claims should be studied to determine the true scope and content of this invention.

I claim:

1. A transmission device having a worm/worm gear clutch comprising:
 an enveloping worm having at least one screw thread engaged by a worm gear;
 wherein said worm and worm gear are self-locking against driving from said worm gear;
 means for rotating said worm about its axis of rotation relative to said worm gear to provide unlocking motion;
 said worm gear being connected to one member of a differential gear set, said differential gear set including two sun gears which provide an input and an output.

2. A transmission device having a worm/worm gear clutch comprising:
 a half worm having a screw thread engaged by a tooth on a worm gear;
 means for rotating said half worm about its axis of rotation relative to said worm gear;
 wherein said half worm and said worm gear are self locking against driving from said worm gear;
 said worm gear being connected to one member of a differential gear set;
 wherein two other members of said differential gear set provide an input and an output;
 wherein said means for rotating said half worm about its axis of rotation provides unlocking motion.

3. The transmission device as recited in claim 2 wherein said differential gear set is a differential comprising two sun gears with one sun gear connected to said worm gear.

4. The transmission device as recited in claim 2 wherein said differential gear set is a differential comprising a ring gear and a sun gear with the sun gear connected to said worm gear.

5. The transmission device as recited in claim 2 wherein said differential gear set is a differential comprising a sun gear and a ring gear with the ring gear connected to said worm gear.

6. The transmission device as recited in claim 2 wherein said differential gear set is a differential comprising a sun gear with a carrier of the differential connected to said worm gear.

7. The transmission device as recited in claim 2 wherein said differential gear set is a differential comprising two sun gears with a carrier of the differential connected to said worm gear.

8. The transmission device as recited in claim 2 wherein said differential gear set is a bevel differential with one bevel gear connected to said worm gear.

9. The transmission device as recited in claim 2 wherein said differential gear set is a bevel differential with a carrier connected to said worm gear.

10. A transmission device having a worm/worm gear clutch comprising:
 an enveloping worm having at least one screw thread engaged by a worm gear;
 wherein said worm and worm gear are self-locking against driving from said worm gear;
 means for rotating said worm about its axis of rotation relative to said worm gear to provide unlocking motion;
 said worm gear being connected to a bevel gear of a bevel differential gear set;
 wherein two other members of said bevel differential gear set provide an input and an output.

* * * * *